United States Patent
Raghavan et al.

(10) Patent No.: US 12,177,703 B2
(45) Date of Patent: Dec. 24, 2024

(54) DYNAMIC MEASUREMENT PERIOD FOR WIRELESS COMMUNICATIONS IN A HIGH-SPEED MODE

(71) Applicant: Apple Inc., Cupertino, CA (US)

(72) Inventors: Manasa Raghavan, Sunnyvale, CA (US); Yushu Zhang, Beijing (CN); Dawei Zhang, Saratoga, CA (US); Haitong Sun, Cupertino, CA (US); Huaning Niu, San Jose, CA (US); Javier Mauricio Parades Riano, Munich (DE); Jianshu Zhang, Munich (DE); Jie Cui, San Jose, CA (US); Qiming Li, Beijing (CN); Shengshan Cui, San Diego, CA (US); Xiang Chen, Campbell, CA (US); Yang Tang, San Jose, CA (US)

(73) Assignee: Apple Inc., Cupertino, CA (US)

(*) Notice: Subject to any disclaimer, the term of this patent is extended or adjusted under 35 U.S.C. 154(b) by 620 days.

(21) Appl. No.: 17/439,713

(22) PCT Filed: Apr. 1, 2021

(86) PCT No.: PCT/CN2021/085106
§ 371 (c)(1),
(2) Date: Sep. 15, 2021

(87) PCT Pub. No.: WO2022/205376
PCT Pub. Date: Oct. 6, 2022

(65) Prior Publication Data
US 2022/0330066 A1    Oct. 13, 2022

(51) Int. Cl.
*H04W 24/10*    (2009.01)
*H04B 17/336*    (2015.01)
(Continued)

(52) U.S. Cl.
CPC .......... *H04W 24/10* (2013.01); *H04B 17/336* (2015.01); *H04L 5/0051* (2013.01); *H04W 56/001* (2013.01); *H04W 88/085* (2013.01)

(58) Field of Classification Search
None
See application file for complete search history.

(56) References Cited

U.S. PATENT DOCUMENTS

2016/0345221 A1* 11/2016 Axmon .............. H04W 36/04
2019/0053087 A1*  2/2019 Callender ......... H04L 1/0017
(Continued)

FOREIGN PATENT DOCUMENTS

WO    2020069164    4/2020
WO    2020250433    12/2020

OTHER PUBLICATIONS

3rd Generation Partnership Project; Technical Specification Group Radio Access Network; NR; Requirements for support of radio resource management (Release 17), 3GPP TS 38.133 V17.0.0, Dec. 2020, 1812 pages.

(Continued)

*Primary Examiner* — Scott M Sciacca
(74) *Attorney, Agent, or Firm* — Kilpatrick Townsend & Stockton LLP

(57) ABSTRACT

The present application relates to devices and components including apparatus, systems, and methods to perform measurements on reference signals or synchronization signal. In an example, timing requirements for performing such measurements can be dynamically changed depending on, at least, a measurement on one of the reference signal or the synchronization signal.

20 Claims, 9 Drawing Sheets

(51) Int. Cl.
    *H04L 5/00*     (2006.01)
    *H04W 56/00*     (2009.01)
    *H04W 88/08*     (2009.01)

(56) References Cited

U.S. PATENT DOCUMENTS

| | | | |
|---|---|---|---|
| 2020/0107337 A1 | 4/2020 | Lin | |
| 2020/0267690 A1* | 8/2020 | Hsieh | H04W 76/28 |
| 2023/0089930 A1* | 3/2023 | Li | H04W 52/028 |
| | | | 370/329 |
| 2023/0403058 A1* | 12/2023 | Khan Beigi | H04L 5/0048 |

OTHER PUBLICATIONS

3rd Generation Partnership Project; Technical Specification Group Radio Access Network; NR; Requirements for support of radio resource management (Release 16), 3GPP TS 38.133 V16.6.0, Dec. 2020, 1844 pages.

Beam Management for High Speed Train Scenario, R4-2001356, 3GPP TSG-RAN WG4 Meeting #94-e,Ericsson, Mar. 6, 2020, 6 pages.

Discussion on HST Transmission Scheme, 3GPP TSG-RAN WG4 Meeting #93, R4-1913269, MediaTek Inc., Nov. 22, 2019, 7 pages.

International Patent Application No. PCT/CN2021/085106, International Search Report and Written Opinion, Mailed on Jan. 7, 2022, 8 pages.

* cited by examiner

DYNAMIC MEASUREMENT PERIOD FOR WIRELESS COMMUNICATIONS IN A HIGH-SPEED MODE

CROSS-REFERENCES TO RELATED APPLICATIONS

This application is a U.S. National Stage Application of PCT/CN2021/085106 filed Apr. 1, 2021. The disclosure of which is herein incorporated by reference in its entirety for all purposes.

Fifth generation mobile network (5G) is a wireless standard that aims to improve upon data transmission speed, reliability, availability, and more. This standard, while still developing, includes numerous details relating to wireless communications for a user equipment (UE) equipment in a high-speed mode, such as when the user equipment is located in a train moving along a railroad at high-speed.

DETAILED DESCRIPTION

Figure 1:
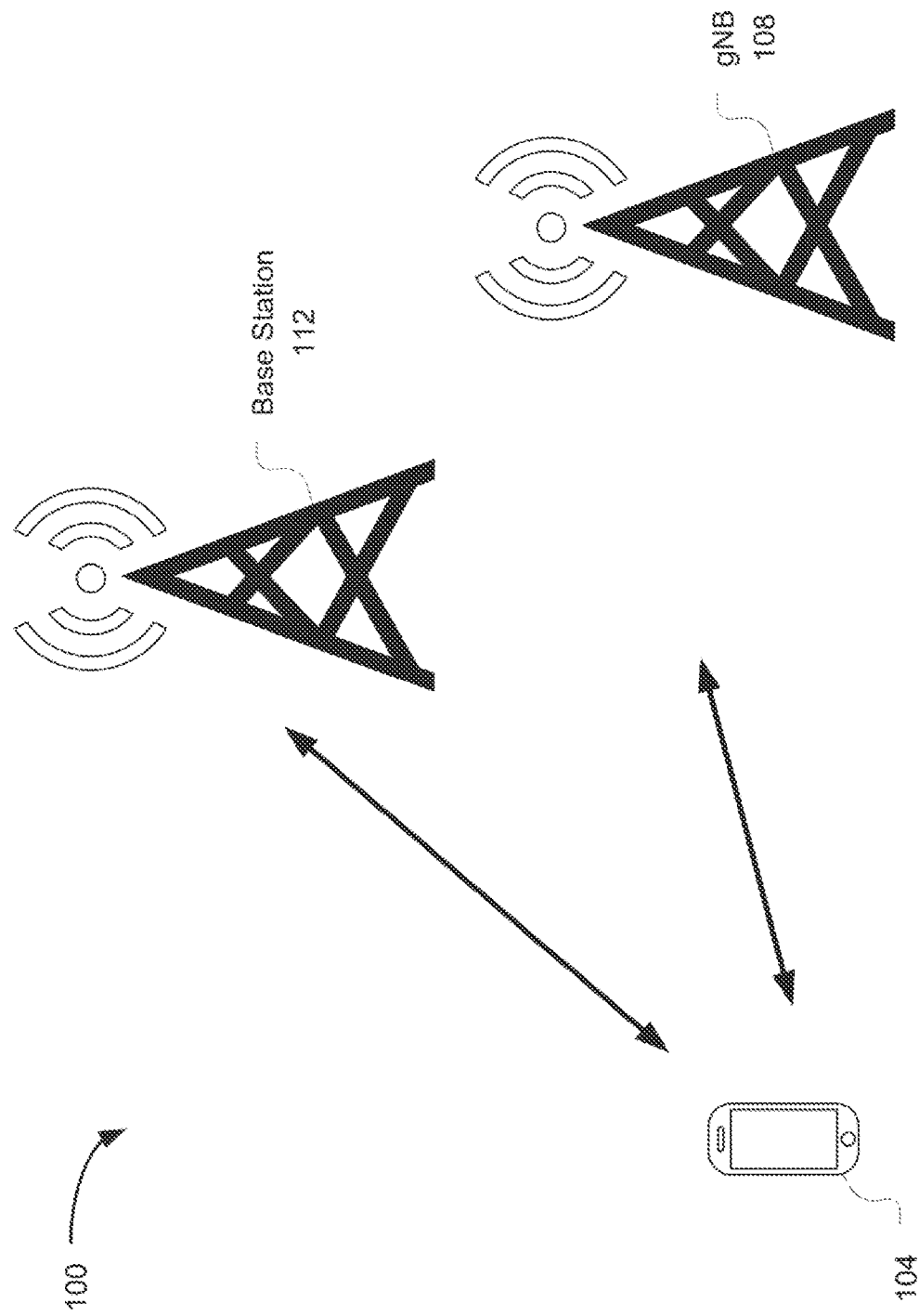
FIG. 1 illustrates an example of a network environment, in accordance with some embodiments.

The following detailed description refers to the accompanying drawings. The same reference numbers may be used in different drawings to identify the same or similar elements In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) is mobile and can be in a high-speed mode in frequency range 1 (FR1) band between 40 Megahertz (MHz) and 7,125 MHz with the UE supporting dynamic point selection (DPS). Particularly, the UE can communicate with different remote radio heads (RRHs) along a travel path (e.g., a railroad), where these RRHs use the same cell identifier (ID) and are coupled to the same base station (e.g., a gNB). The RRHs can transmit reference signals or synchronization signals to the UE that, in turn, perform measurements on such signals to switch communications from one RRH to another RRH (e.g., layer 1 reference signal received power (L1-RSRP) measurements on synchronization signal blocks (SSBs), channel state information reference signals (CSI-RSs) in FR1, or layer 1 signal-to-noise and interference ratio (L1-SINR) measurements on SSBs or CSI-RSs in FR1). The measurements need to be performed within a particular time period. However, given the high speed of the UE's mobility along the travel path, the UE may be in vicinity of one RRH and quickly move away to become in vicinity of the next, adjacent RRH. As such, when the UE is in vicinity of one of the RRHs, the measurements on the signals of the adjacent RRH are typically weaker, but yet these measurements are performed. Because of the high-speed travel, it can be challenging for the UE to perform the different measurements.

Embodiments of the present disclosure allow relaxing (e.g., increasing) the measurement time period for the signals received from the adjacent (yet farther away) RRH by a scaling factor (e.g., 1.5) relative to the measurement period used for the signals received from the in vicinity RRH. To determine whether the scaling factor is to be applied, the UE can initially perform measurements on the signals received from both RRHs. If either the difference between them is less than a first threshold measurement or the measurement of one of them exceeds a second threshold measurement, then the UE implicitly detects its vicinity to one of the RRHs and, thus, relaxes the measurement time period for the other RRH.

As used herein, high-speed refers to a speed that is larger than a speed threshold, such as fifty Kilometers per hour (Kph), one-hundred Kph, or some other value up to an upper bound, such as five-hundred Kph. When traveling at the high-speed, the UE may be operating in a high-speed mode. The high-speed mode is an operational mode that supports a travel speed of the UE larger than the speed threshold. The high-speed mode may also be referred to as a high-speed train (HST) mode.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a tscombination of one or more hardware element (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements at a common communication protocol layer have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell.

The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include CSI-RSs. A CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another, 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

In an example, communications with the gNB 108 and/or the base station can use channels in the frequency range 1 (FR1) band and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should applies a clear channel assessment (CCA) check before using the channel.

As further illustrated in FIG. 1, the network environment 100 may further include a base station 112 with which the UE 104 may also connect. The base station 112 can support the same RAT as the gNB 108 (e.g., the base station 112 is also a gNB). Additionally or alternatively, the base station 112 can support a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station 112. The CCs can belong to a same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via SCell activation procedures where the component carriers of these serving cells can be intra-band contiguous, intra-band non-contiguous, or inter-band. The serving cells can be collocated or non-collocated.

Further, the UE 104 performs a cell reselection procedure to change cells (e.g., serving cells) after a UE is camped on (e.g., registered) a cell and stays in an idle mode or an inactive mode. To do so, the UE 104 uses a set of cell reselection criteria including absolute priority, radio link quality, and cell accessibility. For example, after cell detection, cell selection, and cell registration, the UE 104 enters an idle mode if no communication traffic exists and received RRC-release message from the network. The UE 104 enters to the inactive mode if no communication traffic exists and received RRC-suspend message from the network. In any of these two modes, a cell reselection procedure can be performed. Per this procedure, the UE 104 measures synchronization signals including, for instance, synchronization signal reference signal received power (SS-RSRP) measurements and reference synchronization signal received quality (SS-RSRQ) measurements on PSSs and SSSs in SSBs. Further, the UE 104 can perform another cell detection if the measurements are poor or undetectable and, otherwise, evaluate the cell reselection criteria. If the cell reselection criteria are not met, the UE 104 remains camped on the current cell and does not select another cell. If the criteria are met, the UE 104 selects the best fitting cell and performs the registration process to the this cell, thereby camping on it.

Figure 2:
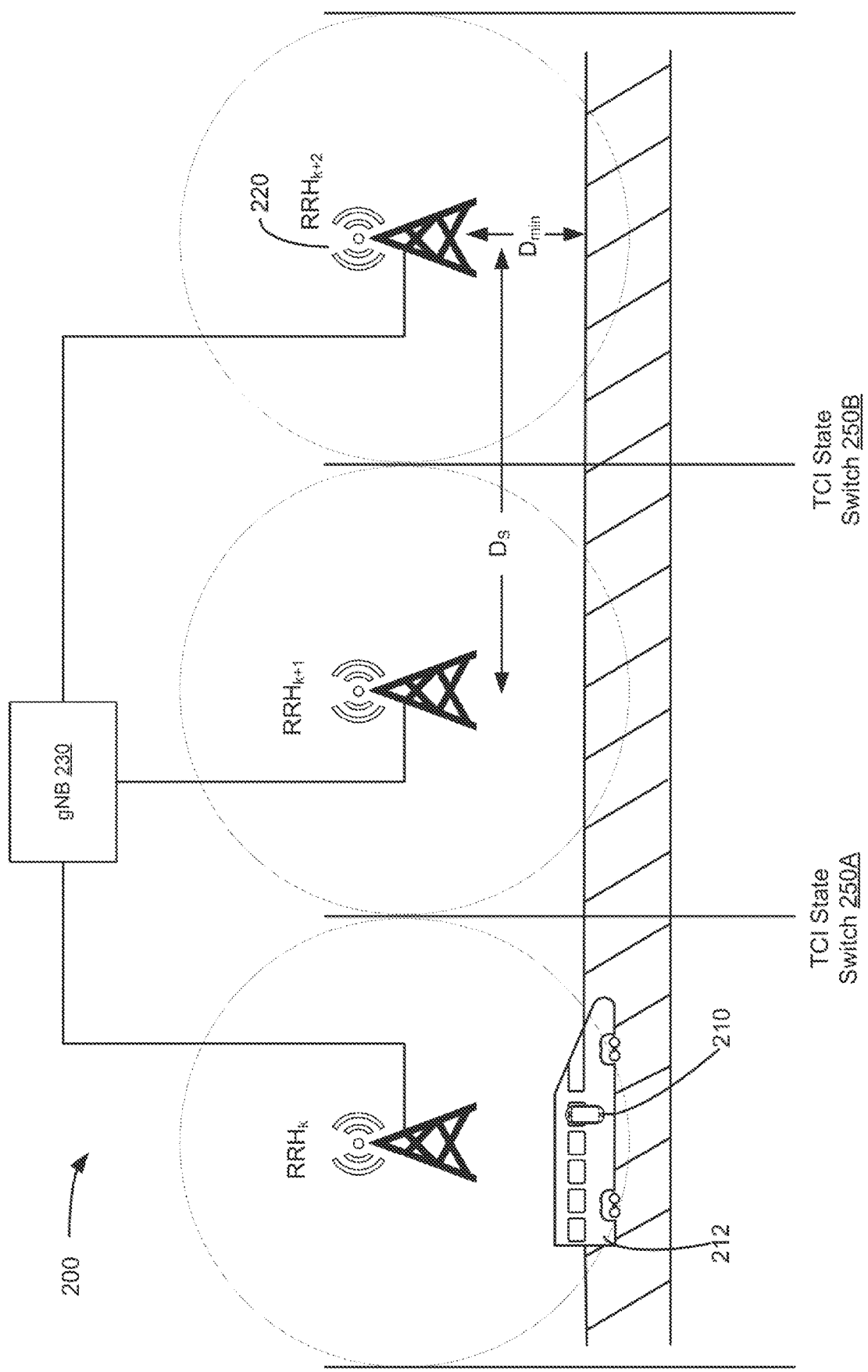
FIG. 2 illustrates an example of a high-speed mode of a user equipment (UE), in accordance with some embodiments.

FIG. 2 illustrates an example of a high-speed mode 200 of a UE 210, in accordance with some embodiments. In the high-speed mode 200, the UE 210 may be traveling at a speed that exceeds a speed threshold. In the illustration of FIG. 2, the high-speed mode 200 is a high-speed train (HST) mode, shown with the UE 210 being located in a train 212 traveling at a high-speed along a railroad. As the UE 210 travels, serving cells may become available and other serving cells may become unavailable, where the availability/unavailability depends on the UE's 210 travel speed.

In an example, DPS is used in conjunction with the high-speed mode 200 in FR1. Generally, DPS is a downlink (DL) coordinated multipoint (CoMP) technique that switches the serving data transmission point (TP) of a the UE 210 dynamically among the UE's 210 cooperating set of TPs without necessitating a cell handover. The TPs use the same cell ID (e.g., a physical cell ID) and are communicatively coupled (e.g., via wired data connections) to a base station that has the same cell ID. In the illustration of FIG. 2, the TPs and the base station are illustrated as remote radio heads (RRHs) 220 and a gNB 230, respectively, although other types of transmitters (which may also be transceivers) and/or a different number of base stations are possible.

Continuing with the illustration of FIG. 2 (and, equivalently, for any distributions of transmitters/base stations along a travel path) in support of DPS, the RRHs 220 are geographically distributed along a railroad. The distribution is indicated with the identifier "k", whereby $RRH_{k+1}$ is adjacent to $RRH_k$, where $RRH_{k+2}$ is adjacent to $RRH_{k+1}$, and so on. This distribution can be subject to certain requirements. For instance, 3GPP defines the following deployment parameters:

TABLE 1

| Parameter | Value |
| --- | --- |
| $D_s$ | 700 m |
| $D_{min}$ | 150 m |
| V | 500 Kph |
| $f_d$ | 870 Hz for 15 kHz subcarrier spacing (SCS) test; 1667 Hz for 30 kHz SCS test |

$D_s$ is the minimum distance between two RRHs. $D_{min}$ is the minimum distance of an RRH to the railroad. V is the maximum travel speed. And $f_d$ is the maximum Doppler effect.

In the above DPS deployment scenario for the high-speed mode in FR1, the UE 210 can receive data signals (e.g., carrying data on PDSCH) from one RRH at a time. One set of SSBs, tracking reference signals (TRSs), and non-zero power (NZP) CSI-RSs are transmitted from even numbered RRHs (e.g., $RRH_k$, $RRH_{K+2}$, etc.), whereas a second set of SSBs, TRSs, and NZP CSI-RSs are transmitted from odd numbered RRHs (e.g., $RHH_{k+1}$, $RRH_{K+3}$, etc.). These two sets can be numbered as SSB1, TRS1, NZP CSI-RSI for the even numbered RRHs, and SSB2, TRS2, NZP CSI-RS2 for the odd numbered RRHs.

Furthermore, the UE 210 can use QCL antennas. In such situations, TCI state information is provided to the UE (e.g., from gNB 230 via one or multiple RRHs) to indicate a QCL type such that the UE can receive reference or synchronization signals from multiple RRHs and perform measurements thereon based on the parameters of the QCL type. Generally, a TCI state switch can occur indicating a change to the QCL type. The physical location of this occurrence can be defined, for instance, as a mid-point between two adjacent RRHs because, for instance, of a significant difference between the Doppler effects of these RRHs at that location. In the illustration of FIG. 2, a first TCI switch 250A can be indicated the to the UE 210 when the UE 210 is approximately at the mid-point between $RRH_k$ and $RRH_{k+1}$. Similarly, a second TCI switch 250B occurs at the mid-point between $RRH_{k+1}$ and $RRH_{k+2}$.

Other deployments are possible for the high-speed mode 200 in FR1. For example, DPS need not be deployed. In such situations, a cell handover process may be used, for instance, as the UE 210 travels along the railroad, such that the UE 210 can connect to different cells over time.

Figure 3:
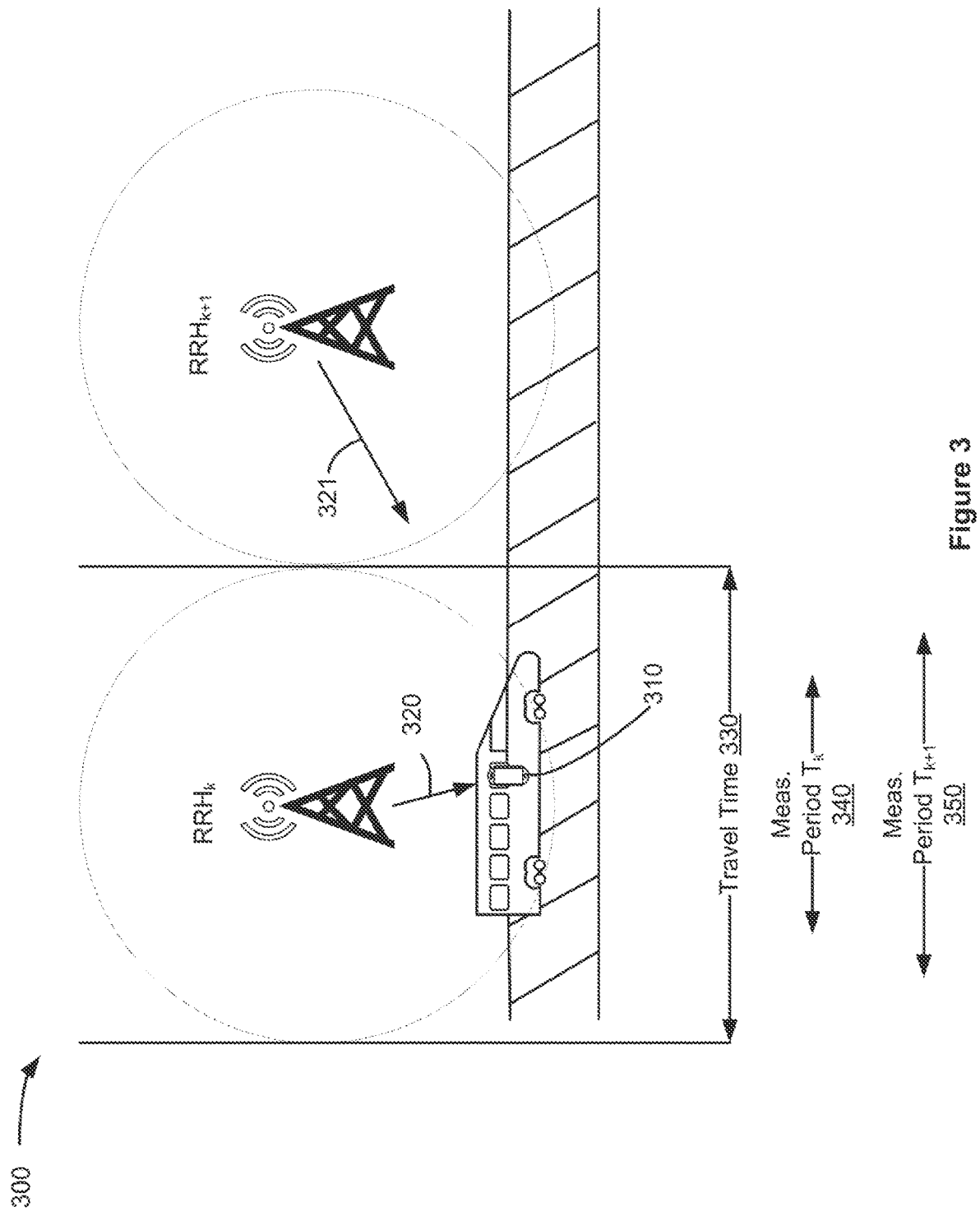
FIG. 3 illustrates an example of timing requirements for measurements by a UE operating in a high-speed mode, in accordance with some embodiments.

FIG. 3 illustrates an example of timing requirements 300 for measurements by a UE 310 operating in a high-speed mode, in accordance with some embodiments. In the illustration of FIG. 3, the deployment involves DPS in FR1. The UE 310 may be quickly traveling between a first RRH and a second RRH (illustrated as $RRH_k$ and $RRH_{k+1}$). For example, with a distance D, of seven-hundred meters between the two RRHs and a travel speed of five-hundred kph, the UE 310 takes about five seconds to travel from $RRH_k$ to $RRH_{k+1}$.

Each of the RRHs may be transmitting a measurement signal (illustrated as a measurement signal 320 transmitted from $RRH_k$ and a measurement signal 321 transmitted from $RRH_{k+1}$). As used herein, a measurement signal is a signal on which the UE 310 can perform a set of measurements. For example, the measurement signal can be a reference signal, such as a CSI-RS, or a synchronization signals, such as SSB. In both cases, a measurement on a measurement signal can be an L1-RSRP or an L1-SINR.

In the illustration of FIG. 3, the UE 310 receives the first measurement signal 320 from $RRH_k$ and the second measurement 321 from $RRH_{k+1}$, where these two signals 320 and 321 are of the same type (e.g., both are CSI-RSs or both are SSBs). These two measurements are received within the travel time 330. In the above illustration of seven-hundred meters and five-hundred Kph, the value of the travel time is about five seconds. Generally, the travel time 330 is a time window having a length that depends on the distance between the adjacent RRHs and the travel speed. The start and end of the time window can correspond to two TCI state switches, whereby the start is the first occurring TC state switch and the end is the subsequent TCI state switch.

The UE 310 performs a first measurement on the first measurement signal 320 (e.g., L1-RSRP or L1-SINR) and a similar second measurement on the second measurement signal 321. The timing of the measurements can be subject to measurement periods (e.g., the UE 310 may need to perform measurements on measurement signals of the RRHs repeatedly, where each measurement may need to be completed within a measurement period).

For non-DPS deployment, 3GPP defines measurement periods for L1-RSRP or L1-SINR measurements. For example, 3GPP TS38.133 V 17.0.0 (2021-01) defines measurement periods in FR1 including, $T_{L1\text{-}RSRP\_Measurmmnt\_Period\_SSB}$, $T_{L1\text{-}RSRP\_Masummnt\_Period\_CSI\text{-}RS}$, $T_{L1\text{-}SLNR\_Measurment\_Period\_CSI\text{-}RS\_CMR\_Ony}$, $T_{L1\text{-}SINR\_Measummnt\_Period\_SSB\_CMR\_IMR}$, and $T_{L1\text{-}SiNR\_Measurement\_PenodCSI\text{-}RS\_CMR\_IMR}$, where these measurement periods range between five milliseconds and ninehundred and sixty milliseconds. However, these definitions may not support a DPS deployment or may be inefficient to use in a DPS deployment.

In particular, while the UE 310 is in vicinity of $RRH_k$, the pathloss for $RRH_{k+1}$ would be higher than that of $RRH_k$. Hence, the L1-RSRP measurements would be lower for $RRH_{k+1}$ compared to $RRH_k$. Likewise, the L1-SINR measurements would be lower for $RRH_{k+1}$ compared to $RRH_k$. Conversely, as the UE 310 travels away from $RRH_k$ in the direction of $RRH_{k+1}$, the UE 310 eventually becomes in vicinity of $RRH_{k+1}$. In this case, the L1-RSRP and L1-SINR measurements would be higher for $RRH_{k+1}$ compared to $RRH_k$.

Given the closer proximity of the UE 310 to an RRH relative to an adjacent RRH and the associated pathlosses, it may be possible to update the measurement periods used for the measurements signals from the two RRHs. As such, the measurement periods can be dynamic, whereby the measurement period used for signals from the farther RRH can be relaxed (e.g., its length and/or periodicity increased) relative to the measurement period used for the signal from the closer RRH until the proximity changes, at which point the opposite relaxation may be used.

Referring to the illustration of FIG. 3, the measurement period for signals 320 from $RRH_k$ is shown as measurement period $T_k$ 340. And the measurement period for signals 321 from $RRH_{k+1}$ is shown as measurement period $T_{k+1}$ 350. These measurement periods 340 and 350 along with the travel time 330 are not dawn to scale (e.g., the travel time 330 can be about five seconds, whereas the measurement periods 340 and 350 can be in the range of five milliseconds to one and a half seconds. Further, each of the measurement periods 340 and 350 can be repeated multiple times within the travel time 330). When the UE 310 is in the vicinity of $RRH_k$, the measurement period $T_k$ is not relaxed, whereas the measurement period $T_{k+1}$ can be relaxed relative the measurement period $T_k$ (e.g., increased by a scaling factor in the range of 1.25 to two, such as 1.5). Conversely, when the UE 310 is in the vicinity of $RRH_{k+1}$, the measurement period $T_{k+1}$ is no longer relaxed, whereas the measurement period $T_k$ can become relaxed relative the measurement period $T_{k+1}$ (e.g., increased by the same scaling factor).

In an example, the UE 310 can determine whether the relaxation (e.g., the scaling factor) is to be applied based on measurements on one or more of measurement signals 320 or 321. In particular, measurement conditions may be defined for the UE 310 and may include predefined threshold measurements. If the measurement conditions are met, the UE 310 can apply the relaxation. Otherwise, no relaxation is applied.

Referring back to L1-RSRP and L1-SINR, the measuring conditions can include the following. First, if L1-RSRP on SSB or CSI-RS from $RRH_k$ is larger than a first predefined threshold measurement (e.g., a certain dB value "Y dB"), it can be assumed that the UE 310 is in vicinity of $RRH_k$ and, thus, the relaxation can be applied to $T_{k+1}$. Similarly, if L1-SINR on SSB or CSI-RS from $RRH_k$ is larger than a first predefined threshold measurement (e.g., a certain dB value "X dB"), it can be assumed that the UE 310 is in vicinity of $RRH_k$ and, thus, the relaxation can be applied to $T_{k+1}$. Second, if the difference between L1-RSRP on SSB or CSI-RS from $RRH_k$ and the L1-RSRP on SSB or CSI-RS from $RRH_{k+1}$ is less than a predefined threshold measurement (e.g., a certain dB difference), it can be assumed that the UE 310 is in vicinity of $RRH_k$ and, thus, the relaxation can be applied to $T_{k+1}$. Similarly, if the difference between L1-SINR on SSB or CSI-RS from $RRH_k$ and the L1-SINR on SSB or CSI-RS from $RRH_{k+1}$ is less than a predefined threshold measurement (e.g., a certain dB difference), it can be assumed that the UE 310 is in vicinity of $RRH_k$ and, thus, the relaxation can be applied to $T_{k+1}$. The opposite also holds true, where $T_k$ would be relaxed when the L1-RSRP or L1-SINR measurements are used to determine the vicinity of the UE 310 to $RRH_{k+1}$. Other measurement conditions can relate to the periodicity of the measurement signal being smaller than a predefined threshold (e.g., measurement period for SSB ($T_{SSB}$) or CSI-RS ($T_{CSI-RS}$) being smaller than, for instance, eighty milliseconds).

In an example, each of $T_k$ and $T_{k+1}$ is a measurement period $T_{L1-RSRP\_Measurement\_Period\_SSB}$. The UE 310 is configured for non-discontinuous reception (non-DRX) of signals. When any or all of the following measurement conditions are met for measurements on SSB or CSI-RS from $RRH_k$ and $RRH_{k+1}$ using $T_k$ and $T_{k+1}$ (where $T_k=T_{k+1}$ for these measurements), the subsequently used measurement period $T_{k+1}$ for L1-RSRP on SSB or CSI-RS from $RRH_{k+1}$ is relaxed by factor of K': (i) L1-RSRP delta between $RRH_{k+1}$ and $RRH_k$ is smaller than X dB, (e.g., L1-$RSRP_{RS-RRH\_k}$-L1-$RSRP_{RS-RRH\_k+1}$<X dB), or (ii) L1-RSRP of $RRH_k$ is greater than certain threshold. YdB (e.g., L1-$RSRP_{RS-RRH\_k}$>Y dB). K' can have a value greater than 1, for example 1.5. Further, the measurement period relaxation may only be applied when $T_{SSB}$ or $T_{CSI-RS}$ is ≤80 ms.

In a particular illustration. K' is set to 1.5 when, as applicable, $T_{SSB}$ or $T_{CSI-RS}$ is ≤80 ms, dynamicMeasPeriod information element (IE) is configured, and delta L1-RSRP>X dB and/or L1-RSRP>Y dB; otherwise, K' is set to one. In this illustration, the measurement period $T_{k+1}$ is equal to max($T_{Report}$, ceil(M*P*K')*$T_{SSB}$) or max($T_{Report}$, ceil(M*P*K')*$T_{CSI-RS}$), where $T_{Report}$ is a configured periodicity for reporting; M=1 if higher layer parameter timeRestrictionForChannelMeasurement is configured, and M=3 otherwise;

$$P = \frac{1}{1 - \frac{T_{SSB}}{MRGP}},$$

when in the monitored cell there are measurement gaps configured for intra-frequency, inter-frequency or inter-RAT measurements, which are overlapping with some but not all occasions of the SSB, P=1 when in the monitored cell there are no measurement gaps overlapping with any occasion of the SSB; delta L1-RSRP is L1-$RSRP_{RS-RRH\_k}$-L1-$RSRP_{RS-RRH\_k+1}$; and L1-RSRP is L1-$RSRP_{RS-RRH\_k}$).

In another example, each of $T_k$ and $T_{k+1}$ is a measurement period $T_{L1-SINR\_Measurement\_Period\_CSI-RS\_CMR\_Only}$. The UE 310 is configured for non-discontinuous reception (non-DRX) of signals. When any or all of the following measurement conditions are met for measurements on SSB or CSI-RS from $RRH_k$ and $RRH_{k+1}$ using $T_k$ and $T_{k+1}$ (where $T_k=T_{k+1}$ for these measurements), the subsequently used measurement period $T_{k+1}$ for L1-SINR on SSB or CSI-RS from $RRH_{k+1}$ is relaxed by factor of K': (i) L1-SINR delta between $RRH_{k+1}$ and $RRH_k$ is smaller than X dB, (e.g., L1-$SINR_{RS-RRH\_k}$-L1-$SINR_{RS-RRH\_k+1}$<X dB), or (ii) L1-SINR of $RRH_k$ is greater than certain threshold, YdB (e.g., L1-$SINR_{RS-RRH\_k}$>Y dB). K' can have a value greater than 1, for example 1.5. Further, the measurement period relaxation may only be applied when $T_{SSB}$ or $T_{CSI-RS}$ is ≤80 ms.

In a particular illustration, K' is set to 1.5 when, as applicable, $T_{SSB}$ or $T_{CSI-RS}$ is ≤80 ms, dynamicMeasPeriod IE is configured, and delta L1-SINR>X dB and/or L1-SINR>Y dB otherwise, K' is set to one. In this illustration, the measurement period $T_{k+1}$ is equal to max($T_{Report}$, ceil(M*P*K')*$T_{SSB}$) or max($T_{Report}$, ceil(M*P*K')*$T_{CSI-RS}$)), where delta L1-SINR is L1-SINR$_{RS-RRH\_k}$-L1-SINR$_{RS-RRH\_k+1}$; and L1-SINR is L1-SINR$_{RS-RRH\_k}$).

Similar measurement conditions can be similarly defined for other types of measurement periods including, for instance, $T_{L1-RSRP\_Measurement\_Period\_SSB}$, $T_{L1-RSRP\_Measurement\_Period\_CSI-RS}$, $T_{L1-SNR\_Measurement\_Period\_SSB\_CMR\_IMR}$, and $T_{L1-SINR\_Measurement\_Period\_CSI-RS\_CMR\_IMR}$. In particular, depending on the value of L1-RSRP$_{RS-RRH\_k}$ or L1-SINR$_{RS-RRH\_k}$, or depending on the delta between this value and L1-RSRP$_{RS-RRH\_k+1}$ or L1-SINR$_{RS-RRH\_k+1}$), the measurement period Tk+1 can be relaxed. This relaxation can also depend on $T_{SSB}$ or $T_{CSI-RS}$ and/or a non-DRX configuration of the UE 310.

Figure 4:
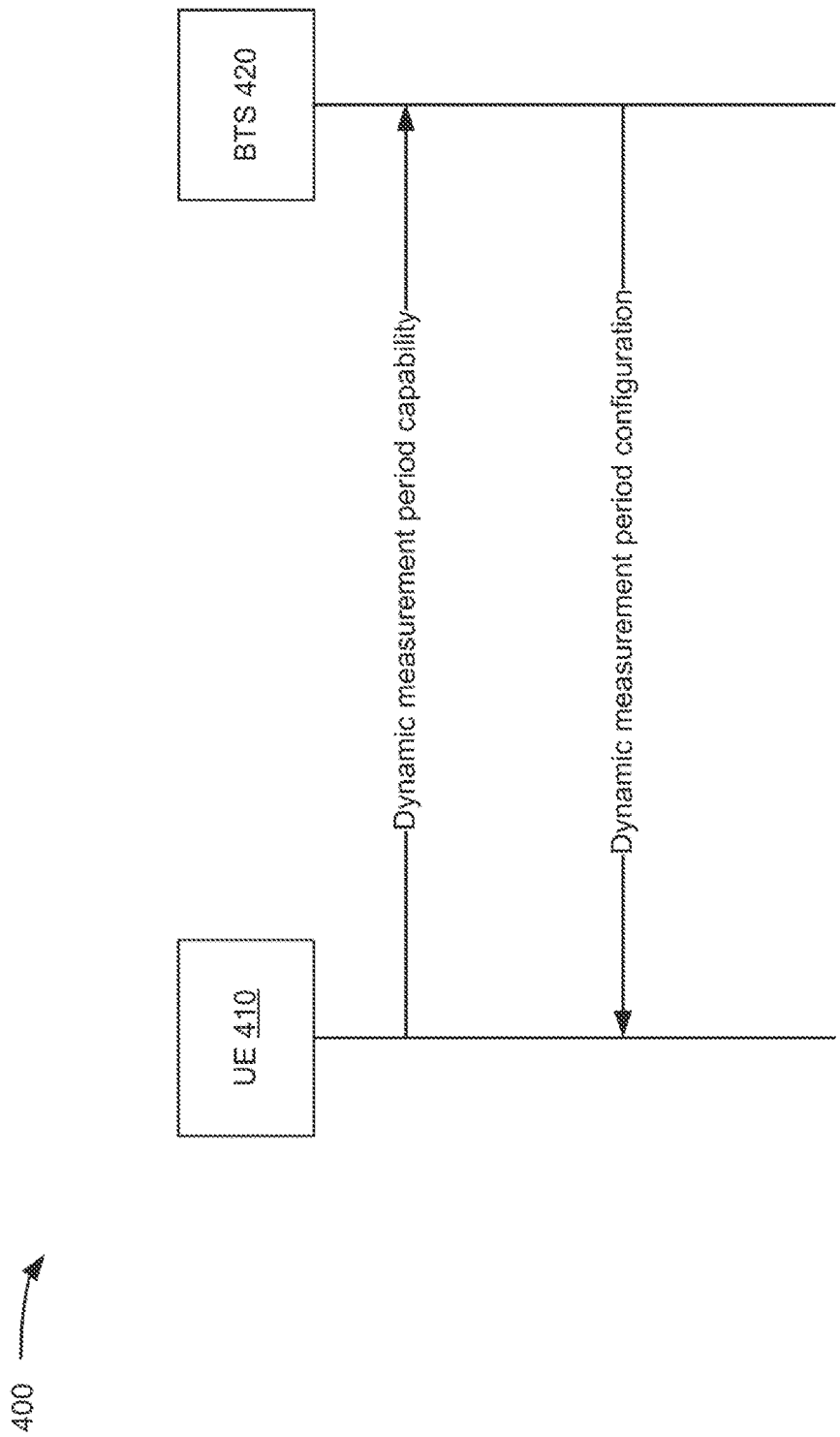
FIG. 4 illustrates an example of signaling between a UE and a base station about a dynamic measurement period, in accordance with some embodiments.

FIG. 4 illustrates an example of signaling 400 between a UE 410 and a base station 420 about a dynamic measurement period, in accordance with some embodiments.

The UE 410 can be an example of the UE 210 of FIG. 2 or the UE 310 of FIG. 3. The base station can be an example of the gNB 230 of FIG. 2. As illustrated in FIG. 4, the signaling 400 includes the UE 410 signaling its dynamic measurement period capability to the base station 420, and the base station 420 signaling a dynamic measurement period configuration to the UE 420.

In an example, the UE 410's signaling is a UE capability signaling for dynamic L1-RSRP and/or L1-SINR measurement period. This UE capability signaling indicates whether the UE supports the dynamic L1-RSRP and/or L1-SINR measurement period or not. Based on the UE capability and the deployment (e.g., a high speed mode in FR1 in conjunction with DPS), the network can enable the dynamic L1-RSRP and/or L1-SINR measurement period for UE 410 based on deployment. This enablement can be indicated in the dynamic measurement period configuration, which can be sent by the base station 420 as an RRC configuration. This network signaling via RRC can be part of a CSI report configuration. Example signaling in a CSI report configuration is shown below.

Figure 5:
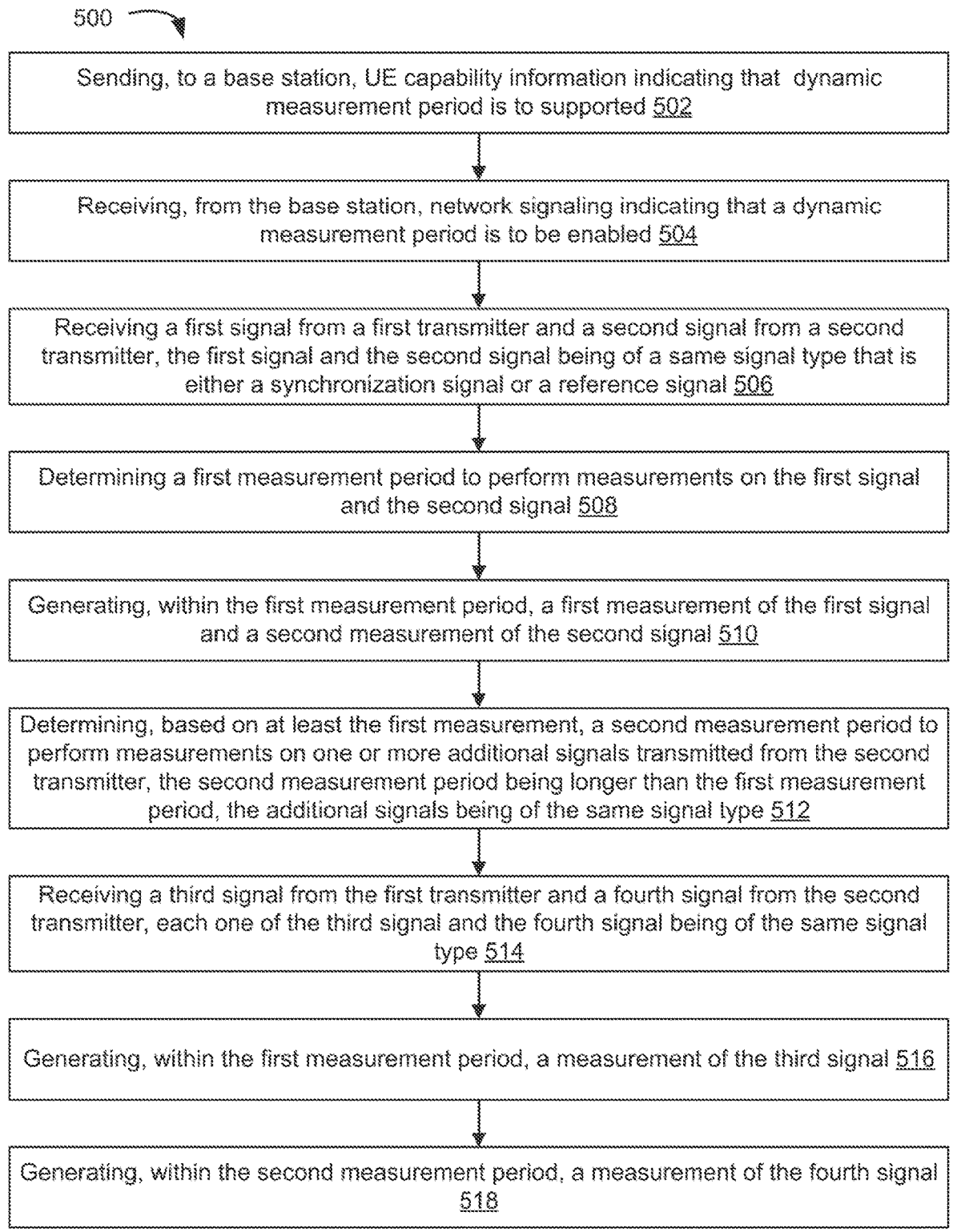
FIG. 5 illustrates an example of an operational flow/algorithmic structure for performing measurement based on a dynamic measurement period, in accordance with some embodiments.

FIG. 5 illustrates an example of an operational flow/algorithmic structure 500 for performing measurement based on a dynamic measurement period, in accordance with some embodiments. A UE can implement the operational flow/algorithmic structure 500 to perform measurements on measurement signals (e.g., L1-RSRP and/or L1-SINR on SSBs or CSI-RSs) while operating in a high-speed mode in FR1 in conjunction with a DPS deployment. The operation flow/algorithmic structure 500 may be performed or implemented by the UE such as, for example, the UE 104, 210, 310, 410, 800, or components thereof, for example, processors 804. The UE can communicate with transmitters (or transceivers), such as RRHs communicatively coupled to a gNB.

The operation flow/algorithmic structure 500 may include, at 502, sending, to a base station, UE capability information indicating that dynamic measurement period is to supported by the UE. The base station can be the gNB or another base station from a NR network. The UE capability information indicates whether the UE supports the dynamic L1-RSRP and/or L1-SINR measurement period or not.

The operation flow/algorithmic structure 500 may include, at 504, receiving, from the base station, network signaling indicating that a dynamic measurement period is to be enabled. For example, the network signaling is an RRC configuration that enables the UE to use the dynamic L1-RSRP and/or L1-SINR measurement period.

The operation flow/algorithmic structure 500 may include, at 506, receiving a first signal from a first transmitter and a second signal from a second transmitter. The first signal and the second signal being of a same signal type that is either a synchronization signal or a reference signal. For example, each of the first signal and the second signal includes an SSB or a CSI-RS. The first transmitter can be an RRH$_k$. The second transmitter can be an RRH$_{k+1}$.

The operation flow/algorithmic structure 500 may include, at 508, determining a first measurement period to perform measurements on the first signal and the second signal. Here, the first measurement period is initially used for both signals until a determination is made to dynamically adjust the measurement period for measurement signals from the second transmitter (or, similarly, the first transmitter). The first measurement period can be any of $T_{L1-RSRP\_Measurement\_Period\_SSB}$, $T_{L1-RSRP\_Measurement\_Period\_CSI-RS}$, $T_{L1-SINR\_Measurement\_Period\_SSB\_CMR\_IMR}$, and

```
CSI-ReportConfig ::=            SEQUENCE {
   reportConfigId                  CSI-ReportConfigId,
   carrier                         ServiceCellIndex             OPTIONAL, - - Need S
   resouresForChannelMeasurement   CSI-ResourceConfigId,
   csi-IM-ResourcesForInterferance CSI-ResourceConfigId         OPTIONAL, - - Need R
   nzp-CSI-RS-ResourcesForInterference CSI-ResourceConfigId     OPTIONAL, - - Need R
   reportConfigType                Choice {
      periodic                        SEQUENCE {
         reportSlotConfig                CSI-ReportPeriodicityAndOffset,
         pucch-CSI-ResourceList          SEQUENCE (SIZE (1..maxNrofBWPs)) OF PUCCH-CSI-Resource
      },
      semiPersistentOnPUCCH           SEQUENCE {
         reportSlotConfig                CSI-ReportPeriodicityAndOffset
   reportQuantity-r16              CHOICE
      cri-SINR-r16                    NULL,
      ssb-Index-SINR-r16              NULL                      OPTIONAL, - - Need R
   }                                                            OPTIONAL, - - Need R
   codebookConfig-r16              CodebookConfig-r16
   }]
   DynamicMeasPeriod-17            ENUMERATED {configured, notConfigured}
}
```

$T_{L1\text{-}SINR\_Measurement\_Period\_CSI\text{-}RS\_CMR\_IMR}$, depending on the type of measurement signals and measurements to be performed (e.g., SSBs, CSI-RS, L1-RSRP, L1-SINR, etc.).

The operation flow/algorithmic structure 500 may include, at 510, generating, within the first measurement period, a first measurement of the first signal and a second measurement of the second signal. Here, the UE completes the L1-RSRP or L1-SINR measurement on the first signal and the L1-RSRP or L1-SINR measurement on the second signal within the first measurement period (e.g., within a measuring window having a time length equal to that of the first measurement period).

The operation flow/algorithmic structure 500 may include, at 512, determining, based on at least the first measurement, a second measurement period to perform measurements on one or more additional signals transmitted from the second transmitter, the second measurement period being longer than the first measurement period, the additional signals being of the same signal type. Here, the first measurement (e.g., the L1-RSRP or L1-SINR measurement on the first signal) can be used to assess one or more measurement conditions. For instance, if the L1-RSRP or L1-SINR measurement on the first signal is greater than a predefined threshold measurement or if the difference between this L1-RSRP or L1-SINR measurement and the L1-RSRP or L1-SINR measurement on the second signal is less than a predefined threshold measurement, the first measurement period is relaxed by a scaling factor, such that the second measurement period is equal to the value of the first measurement period multiplied by the scaling factor. The first measurement period may continue to be used for performing L1-RSRP or L1-SINR measurements on SSBs or CSI-RSs subsequently received from the first transmitter, while the second measurement period may be used for performing L1-RSRP or L1-SINR measurements on SSBs or CSI-RSs subsequently received from the second transmitter, as further described herein below.

The operation flow/algorithmic structure 500 may include, at 514, receiving a third signal from the first transmitter and a fourth signal from the second transmitter, each one of the third signal and the fourth signal being of the same signal type. For example, each of the first signal and the second signal includes an SSB or a CSI-RS and is received after the second measurement period is determined.

The operation flow/algorithmic structure 500 may include, at 516, generating, within the first measurement period, a measurement of the third signal. Here, the third signal is from the first transmitter, and the first measurement period has not been relaxed for measurement signals from this first transmitter. Accordingly, the UE completes an L1-RSRP or L1-SINR measurement on the third signal within the first measurement period (e.g., within a next measuring window having a time length equal to that of the first measurement period).

The operation flow/algorithmic structure 500 may include, at 518, generating, within the second measurement period, a measurement of the fourth signal. Here, the fourth signal is from the second transmitter, and the first measurement period has been relaxed such that the second measurement period is to be used for measurement signals from this second transmitter. Accordingly, the UE completes an L1-RSRP or L1-SINR measurement on the fourth signal within the second measurement period (e.g., within another measuring window having a time length equal to that of the second measurement period).

Figure 6:
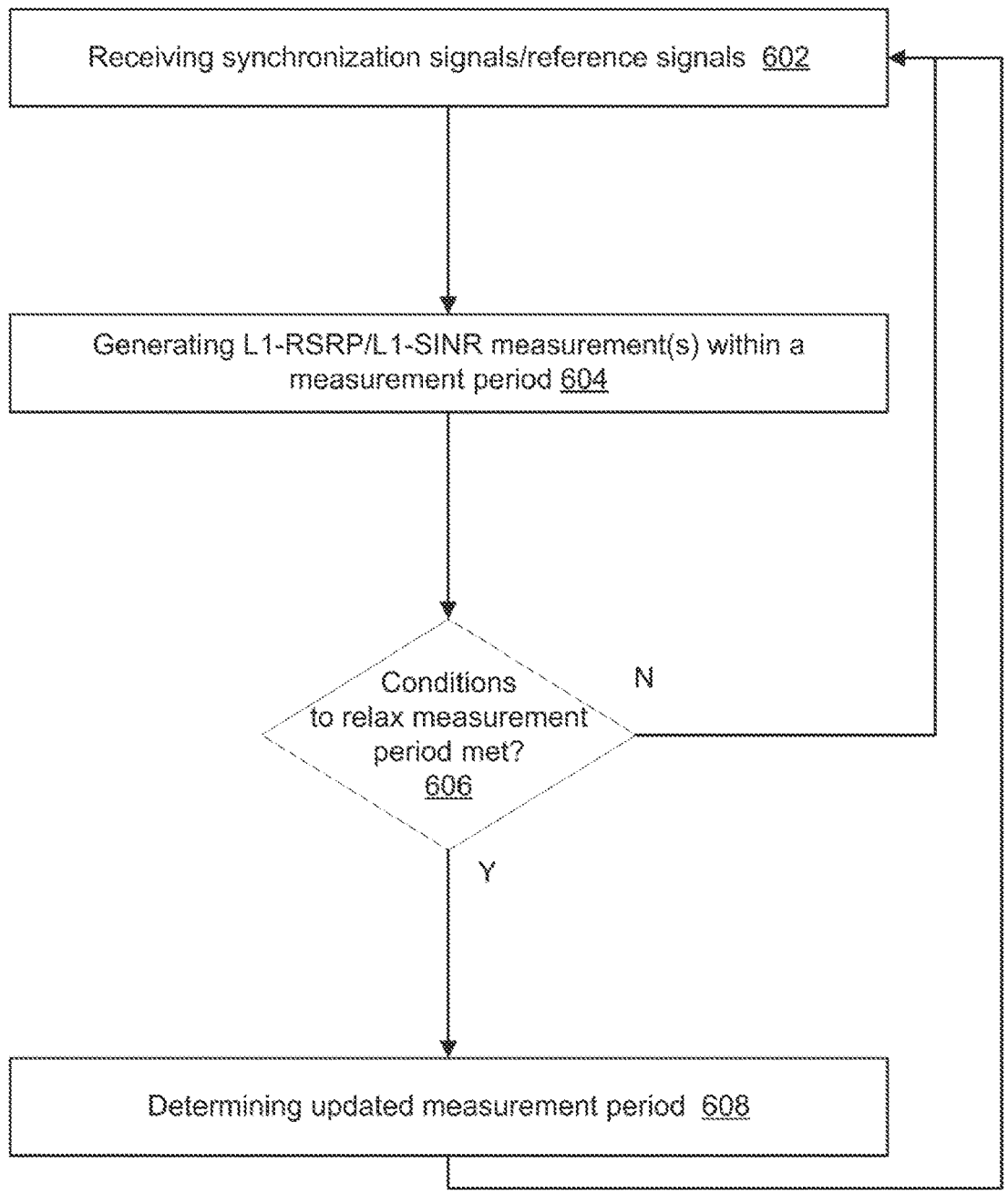
FIG. 6 illustrates an example of an operational flow/algorithmic structure for using measurement conditions to determine an updated measurement period, in accordance with some embodiments.

FIG. 6 illustrates an example of an operational flow/algorithmic structure 600 for using measurement conditions to determine an updated measurement period, in accordance with some embodiments. A UE can implement the operational flow/algorithmic structure 600 to dynamically update the measurement periods for measurement signals (e.g., L1-RSRP and/or L1-SINR on SSBs or CSI-RSs) while operating in a high speed mode in FR1 in conjunction with a DPS deployment. The operation flow/algorithmic structure 600 may be performed or implemented as part of the operation flow/algorithmic structure 500 by the UE such as, for example, the UE 104, 210, 310, 410, 800, or components thereof, for example, processors 804. The UE can communicate with transmitters (or transceivers), such as RRHs communicatively coupled to a gNB.

The operation flow/algorithmic structure 600 may include, at 602, receiving synchronization signals or reference signals. For example, the UE receives SSBs or CSI-RSs from transmitters, such as RRHs distributed along a railroad in support of a DPS deployment.

The operation flow/algorithmic structure 600 may include, at 604, generating L1-RSRP/L1-SINR measurement(s) within a measurement period. For example, SSB1 and SSB2 are received from $RRH_k$ and $RRH_{k+1}$, respectively. Additionally or alternatively, CSI-RS1 and CSI-RS2 are received from $RRH_k$ and $RRH_{k+1}$, respectively. The UE generates a first L1-RSRP or L1-SINR measurement on SSB1 or CSI-RS1, as applicable. Likewise, the UE generates a second L1-RSRP or L1-SINR measurement on SSB2 or CSI-RS2. These measurements are generated within a time window having a length equal to any of measurement periods $T_{L1\text{-}RSRP\_Measurement\_Period\_SSB}$, $T_{L1\text{-}RSRP\_Measurement\_Period\_CSI\text{-}RS}$, $T_{L1\text{-}SINR\_Measurement\_Period\_SSB\_CMR\_IMR}$, or $T_{L1\text{-}SINR\_Measurement\_Period\_CSI\text{-}RS\_CMR\_IMR}$ as applicable.

The operation flow/algorithmic structure 600 may include, at 606, determining whether conditions to relax the measurement period are met. In an example, the conditions include measurement conditions. For instance, the UE assesses the following measurement conditions for the measurements on SSB1 or CSI-RS1 and measurement on SSB2 or CSI-RS2. (i) L1-RSRP delta or L1-SINR delta, as applicable, between SSB2 and SSB1 or between CSI-RS2 and CSI-RS1, as applicable, is smaller than X dB, or (ii) L1-RSRP or L1-SINR, as applicable, of SSB1 is greater than certain threshold, YdB (e.g., $L1\text{-}SINR_{RS\text{-}RRH\_k} > Y$ dB). Further, the UE can determine whether $T_{SSB}$ or $T_{CSI\text{-}RS}$ is ≤80 ms. If any of (i) or (ii) measurement condition and the $T_{SSB}$ or $T_{CSI\text{-}RS}$ condition is met, the UE can determine that the measurement period can be relaxed. This determination can also be subject to the UE operating in a non-DRX mode. If the measurement period is to be relaxed, the operation flow/algorithmic structure 600 moves to 608. Otherwise, the operation flow/algorithmic structure 600 loops back to 602.

The operation flow/algorithmic structure 600 may include, at 608, determines an updated measurement period. For example, the measurement period is relaxed, whereby its value is multiplied by a scaling factor K' (e.g., in the range of 1.25 and two, such as 1.5). The updated value has a time length that is K' times longer than the updated measurement period. Upon a subsequent SSB2 or CSI-RS2 from $RRH_{k+1}$, a L1-RSRP or L1-SINR measurement on SSB2 or CSI-RS2 is performed within the longer time length of the updated measurement period. In comparison, upon a subsequent SSB1 or CSI-RS1 from $RRH_k$, a L1-RSRP or L1-SINR measurement on SSB1 or CSI-RS1 is performed within the shorter time length of the measurement period.

Figure 7:
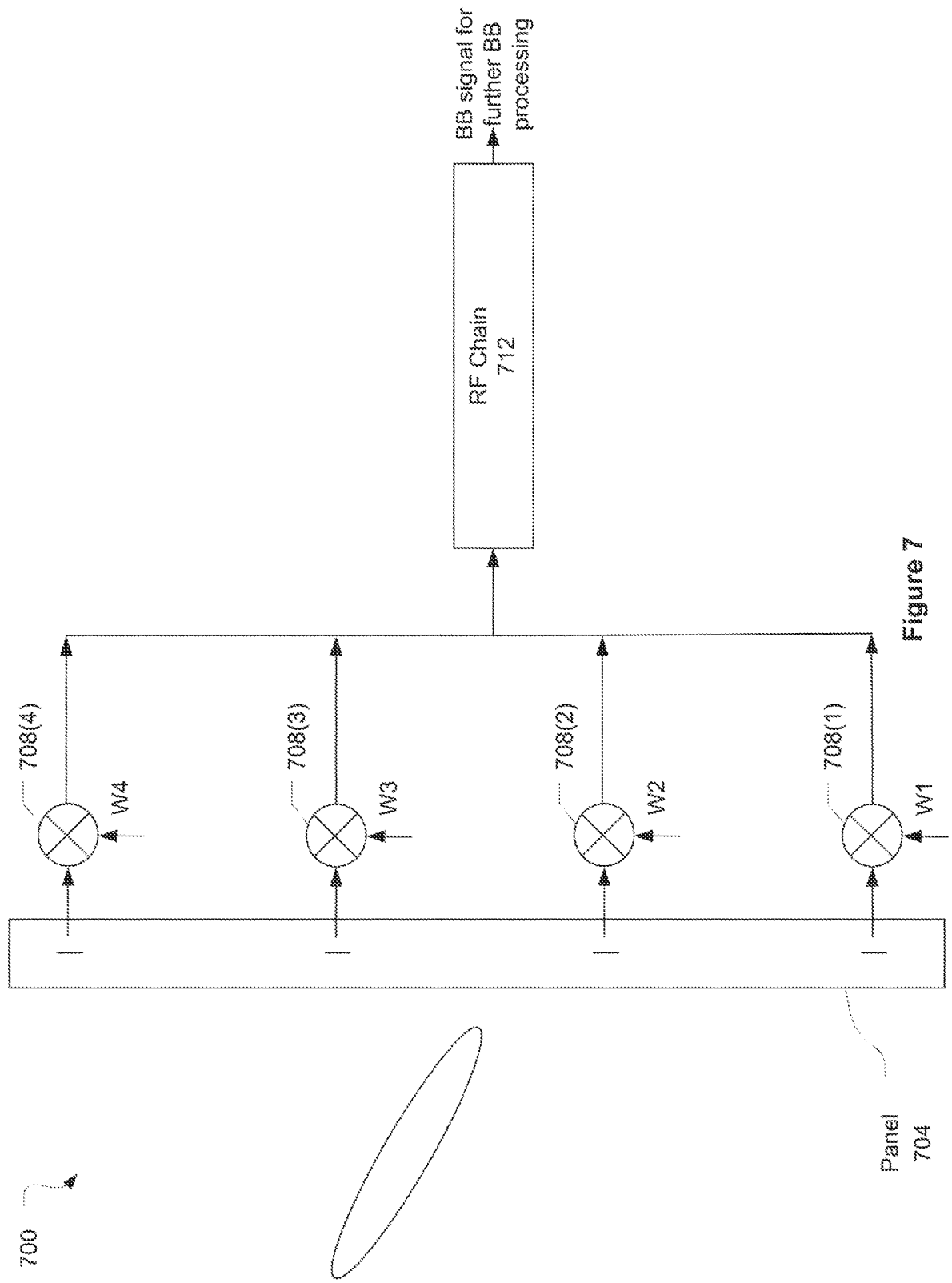
FIG. 7 illustrates an example of receive components, in accordance with some embodiments.

FIG. 7 illustrates receive components 700 of the UE 74 in accordance with some embodiments. The receive components 700 may include an antenna panel 704 that includes a number of antenna elements. The panel 704 is shown with four antenna elements, but other embodiments may include other numbers.

The antenna panel 704 may be coupled to analog beamforming (BF) components that include a number of phase shifters 708(1)-708(4). The phase shifters 708(1)-708(4) may be coupled with a radio-frequency (RF) chain 712. The RF chain 712 may amplify a receive analog RF signal, down-convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 708(1)-708(4) to provide a receive beam at the antenna panel 704. These BF weights may be determined based on the channel-based beamforming.

Figure 8:
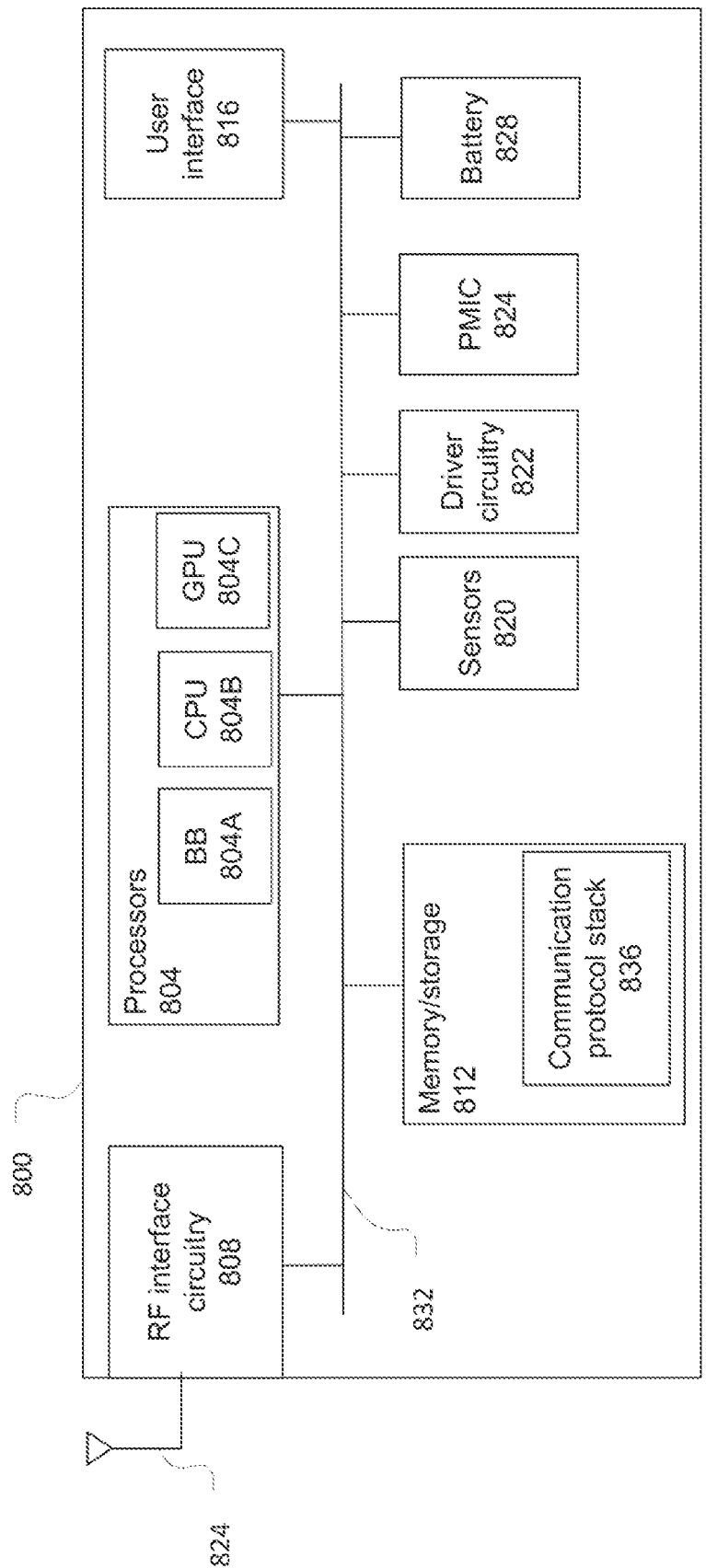
FIG. 8 illustrates an example of a UE, in accordance with some embodiments.

FIG. 8 illustrates a UE 800 in accordance with some embodiments. The UE 800 may be similar to and substantially interchangeable with UE 104 of FIG. 1.

Similar to that described above with respect to UE 104, the UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 800 may include processors 804, RF interface circuitry 808, memory/storage 812, user interface 816, sensors 820, driver circuitry 822, power management integrated circuit (PMIC) 824, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangements of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 804A may also access group information 824 from memory/storage 812 to determine search space groups in which a number of repetitions of a PDCCH may be transmitted.

The memory/storage 812 may include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 808 may include transceiver circuitry and a radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 824 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 824.

In various embodiments, the RF interface circuitry 808 may be configured to transmit/receive signals in a manner compatible with NR access technologies.

The antenna 824 may include a number of antenna elements that each convert electrical signals into radio waves to travel through the air and to convert received radio waves into electrical signals. The antenna elements may be arranged into one or more antenna panels. The antenna 824 may have antenna panels that are omnidirectional, directional, or a combination thereof to enable beamforming and multiple input, multiple output communications. The antenna 824 may include micro-strip antennas, printed antennas fabricated on the surface of one or more printed circuit boards, patch antennas, phased array antennas, etc. The antenna 824 may have one or more panels designed for specific frequency bands including bands in FR1 or FR2.

The user interface circuitry 816 includes various input/output (110) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators, for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers, level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the UE 800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
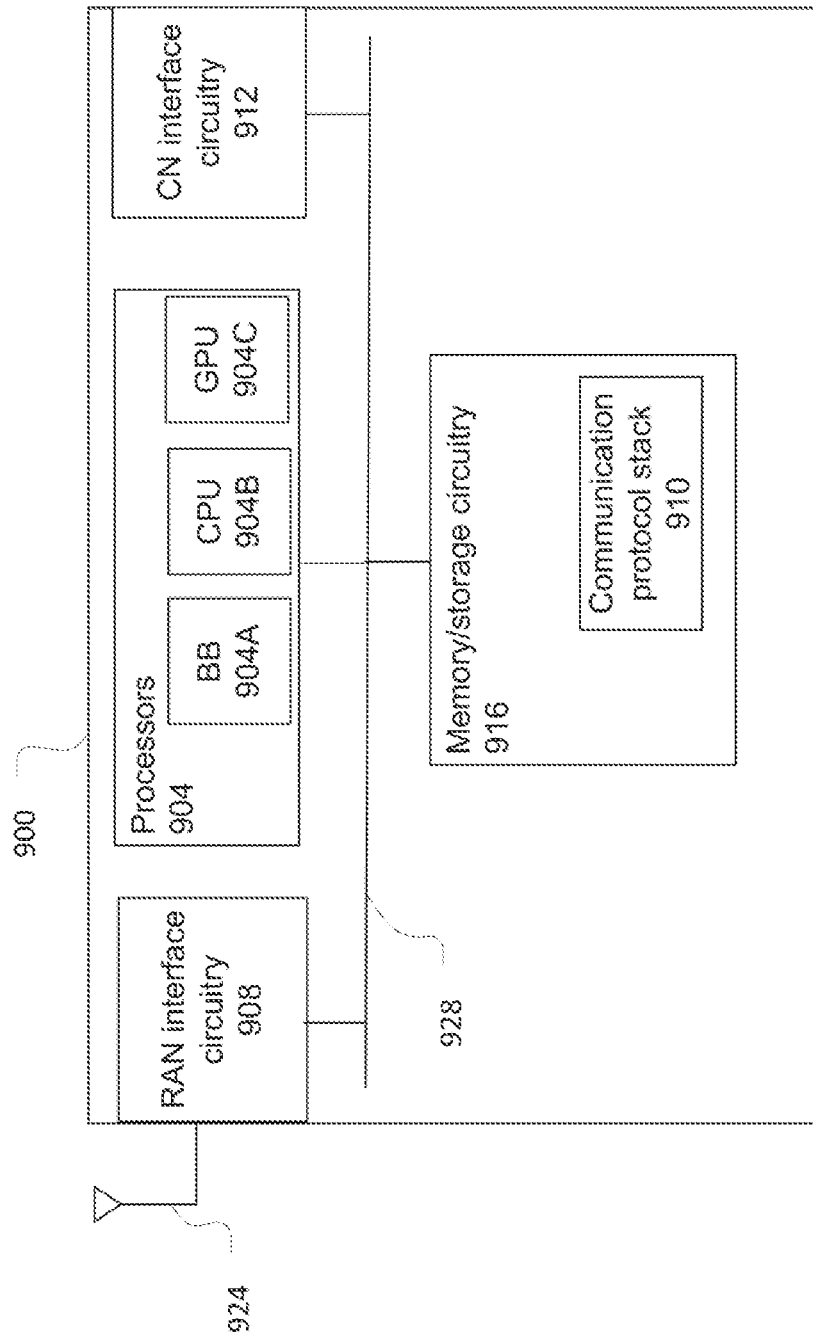
FIG. 9 illustrates an example of a base station, in accordance with some embodiments.

FIG. 9 illustrates a gNB 900 in accordance with some embodiments. The gNB node 900 may be similar to and substantially interchangeable with gNB 78. A base station, such as the base station 92, can have the same or similar components as the gNB 900.

The gNB 900 may include processors 904, RF interface circuitry 908, core network (CN) interface circuitry 912, and memory/storage circuitry 916.

The components of the gNB 900 may be coupled with various other components over one or more interconnects 928.

The processors 904, RF interface circuitry 908, memory/storage circuitry 916 (including communication protocol stack 910), antenna 924, and interconnects 928 may be similar to like-named elements shown and described with respect to FIG. 7.

The CN interface circuitry 912 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method. The method implemented on a user equipment (UE). The method comprises: receiving a first signal from a first transmitter and a second signal from a second transmitter, the first signal and the second signal being of a same signal type that is either a synchronization signal or a reference signal; determining a first measurement period to perform measurements on the first signal and the second signal; generating, within the first measurement period, a first measurement of the first signal and a second measurement of the second signal; and determining, based on at least the first measurement, a second measurement period to perform measurements on one or more additional signals transmitted from the second transmitter, the second measurement period being longer than the first measurement period, the additional signals being of the same signal type.

Example 2 includes a method of example 1 further comprising: receiving a third signal from the first transmitter and a fourth signal from the second transmitter, each one of the third signal and the fourth signal being of the same signal type as the first signal and the second signal; generating, within the first measurement period, a measurement of the third signal; and generating, within the second measurement period, a measurement of the fourth signal.

Example 3 includes a method of any preceding examples 1-2, wherein each one of the first signal and the second signal includes a respective synchronization signal block (SSB) or a respective channel state information reference signal (CSI-RS) in frequency range 1 (FR1), wherein each one of the first measurement and the second measurement is a layer 1 reference signal received power (L1-RSRP) measurement on SSB or CSIR-RS, and wherein each one of the first measurement period and the second measurement period is a respective measurement period for L1-RSRP measurements.

Example 4 includes a method of any preceding examples 1-2, wherein each one of the first signal and the second signal includes a respective synchronization signal block (SSB) or a respective channel state information reference signal (CSI-RS) in frequency range 1 (FR1), wherein each one of the first measurement and the second measurement is a layer 1 signal-to-noise and interference ratio (L1-SINR) measurement on SSB or CSI-RS, and wherein each one of the first measurement period and the second measurement period is a respective measurement period for L1-SINR measurements.

Example 5 includes a method of any preceding examples 1-4, wherein the first transmitter includes a first remote radio head (RRH) that is associated with a cell identifier and is communicatively coupled with a base station, wherein the second transmitter includes a second RRH that is associated with the cell identifier, is communicatively coupled with the base station, and is at distance away from the first RRH, wherein an operational mode of the UE is a high-speed mode that supports a travel speed larger than a speed threshold, and wherein the UE is configured to support a dynamic point selection (DPS) in the high-speed mode.

Example 6 includes a method of example 5, wherein the second measurement period represents a relaxation of the first measurement period by a scaling factor for the one or more additional signals transmitted from the second RRH and not for an additional signal transmitted from the first RRH.

Example 7 includes a method of example 5, wherein the second measurement period is used for the measurements on the one or more additional signals upon the UE being closer to the first RRH than to the second RRH.

Example 8 includes a method of example 1, wherein the first signal includes a synchronization signal block (SSB) or a channel state information reference signal (CSI-RS) in frequency range 1 (FR1), wherein the first measurement includes a layer 1 reference signal received power (L1-RSRP) measurement on the SSB or the CSI-RS, and wherein the method further comprises: determining that the L1-RSRP measurement exceeds a predefined threshold measurement; and determining the second measurement period as a relaxation of the first measurement period based on the L1-RSRP measurement exceeding the predefined threshold measurement.

Example 9 includes a method of example 1, wherein the first signal includes a first synchronization signal block (SSB) or a first channel state information reference signal (CSI-RS) in frequency range 1 (FR1), wherein the second signal includes a second SSB or a second CSI-RS in FR1, wherein the first measurement includes a first layer 1 reference signal received power (L1-RSRP) measurement on the first SSB or the first CSI-RS, wherein the second measurement includes a second L1-RSRP measurement on the second SSB or the second CSI-RS, and wherein the method further comprises: determining that a difference between the first L1-RSRP measurement and the second L1-RSRP measurement is smaller than predefined threshold measurement; and determining the second measurement period as a relaxation of the first measurement period based on the difference being smaller than the predefined threshold measurement.

Example 10 includes a method of example 1, wherein the first signal includes a synchronization signal block (SSB) or a channel state information reference signal (CSI-RS) in frequency range 1 (FR1), wherein the first measurement includes a layer 1 reference signal received power (L1-RSRP) measurement on the SSB or the CSI-RS, and wherein the method further comprises: determining the second measurement period as a relaxation of the first measurement period based on the L1-RSRP measurement being larger than a predefined threshold measurement and on a SSB or CSI-RS periodicity being smaller than a predefined threshold time period.

Example 11 includes a method of example 1, wherein the first signal includes a synchronization signal block (SSB) or a channel state information reference signal (CSI-RS) in frequency range 1 (FR1), wherein the first measurement includes a layer 1 reference signal received power (L1-RSRP) measurement on the SSB or the CSI-RS, and wherein the method further comprises: receiving, from a base station, network signaling indicating a predefined threshold measurement; and determining the second measurement period as a relaxation of the first measurement period based on the L1-RSRP measurement and on the predefined threshold measurement.

Example 12 includes a method of example 1, wherein the first signal includes a synchronization signal block (SSB) or a channel state information reference signal (CSI-RS) in frequency range 1 (FR1), wherein the first measurement includes a layer 1 signal-to-noise and interference ratio (L1-SINR) measurement on the SSB or the CSI-RS, and wherein the method further comprises: determining that the L1-SINR measurement exceeds a predefined threshold measurement; and determining the second measurement period as a relaxation of the first measurement period based on the L1-SINR measurement exceeding the predefined threshold measurement.

Example 13 includes a method of example 1, wherein the first signal includes a first synchronization signal block (SSB) or a first channel state information reference signal (CSI-RS) in frequency range 1 (FR1), wherein the second signal includes a second SSB or a second CSI-RS in FR1, wherein the first measurement includes a first layer 1 signal-to-noise and interference ratio (L1-SINR) measurement on the first SSB or the first CSI-RS, wherein the second measurement includes a second L1-SINR measurement on the second SSB or the second CSI-RS, and wherein the method further comprises: determining that a difference between the first L1-SINR measurement and the second L1-SINR measurement is smaller than predefined threshold measurement; and determining the second measurement period as a relaxation of the first measurement period based on the difference being smaller than the predefined threshold measurement.

Example 14 includes a method of example 1, wherein the first signal includes a synchronization signal block (SSB) or a channel state information reference signal (CSI-RS) in frequency range 1 (FR1), wherein the first measurement includes a layer 1 signal-to-noise and interference ratio (L1-SINR) measurement on the SSB or the CSI-RS, and wherein the method further comprises: determining the second measurement period as a relaxation of the first measurement period based on the L1-SINR measurement being larger than a predefined threshold measurement and on a SSB or CSI-RS periodicity being smaller than a predefined threshold time period.

Example 15 includes a method of example 1, wherein the first signal includes a synchronization signal block (SSB) or a channel state information reference signal (CSI-RS) in frequency range 1 (FR1), wherein the first measurement includes a layer 1 signal-to-noise and interference ratio (L1-SINR) measurement on the SSB or the CSI-RS, and wherein the method further comprises: receiving, from a base station, network signaling indicating a predefined threshold measurement; and determining the second measurement period as a relaxation of the first measurement period based on the L1-SINR measurement and on the predefined threshold measurement.

Example 16 includes a method of example 1, wherein the second measurement period is used for the measurements on the one or more additional signals upon the UE being configured for non-discontinuous reception (non-DRX) of signals.

Example 17 includes a method of example 1 further comprising: receiving, from a base station, network signaling indicating that a dynamic measurement period is to be enabled, wherein the second measurement period represents a dynamic updated of the first measurement period by a scaling factor.

Example 18 includes a method of example 17 further comprising sending, to the base station prior to receiving the network signaling, UE capability information indicating that the dynamic measurement period is to be supported.

Example 19 includes a UE comprising one or more processors and one or more memories storing computer-readable instructions that, upon execution by the one or more processors, configure the UE to perform one or more elements of a method described in or related to any of the examples 1-18.

Example 20 includes a UE comprising means to perform one or more elements of a method described in or related to any of the examples 1-18.

Example 21 includes one or more non-transitory computer-readable media storing instructions that, upon execution on a user equipment (UE), cause the UE to perform one or more elements of a method described in or related to any of the examples 1-18.

Example 22 includes a UE comprising logic, modules, or circuitry to perform one or more elements of a method described in or related to any of the examples 1-18.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving a first signal from a first transmitter and a second signal from a second transmitter, the first signal and the second signal being of a same signal type that is either a synchronization signal or a reference signal, wherein the first signal includes a synchronization signal block (SSB) or a channel state information reference signal (CSI-RS) in frequency range 1 (FR1);
   determining a first measurement period to perform measurements on the first signal and the second signal;
   generating, within the first measurement period, a first measurement of the first signal and a second measurement of the second signal, wherein the first measurement includes a layer 1 reference signal received power (L1-RSRP) measurement on the SSB or the CSI-RS; and
   determining, as a relaxation of the first measurement based on the L1-RSRP measurement being larger than a predefined threshold measurement and on a SSB or CSI-RS periodicity being smaller than a predefined threshold time period, a second measurement period to perform measurements on one or more additional signals transmitted from the second transmitter, the second measurement period being longer than the first measurement period, the one or more additional signals being of the same signal type.

2. The method of claim 1 further comprising:
   receiving a third signal from the first transmitter and a fourth signal from the second transmitter, each one of the third signal and the fourth signal being of the same signal type as the first signal and the second signal;
   generating, within the first measurement period, a measurement of the third signal; and
   generating, within the second measurement period, a measurement of the fourth signal.

3. The method of claim 1, wherein each one of the first signal and the second signal includes a respective SSB or a respective CSI-RS in FR1, wherein each one of the first measurement and the second measurement is a respective L1-RSRP, and wherein each one of the first measurement period and the second measurement period is a respective measurement period for L1-RSRP measurements.

4. The method of claim 1, the second measurement is a layer 1 signal-to-noise and interference ratio (L1-SINR) measurement on SSB or CSI-RS.

5. The method of claim 1, wherein the first transmitter includes a first remote radio head (RRH) that is associated with a cell identifier and is communicatively coupled with a base station, wherein the second transmitter includes a second RRH that is associated with the cell identifier, is communicatively coupled with the base station, and is at distance away from the first RRH, wherein an operational mode of a user equipment (UE) is a high-speed mode that supports a travel speed larger than a speed threshold, and wherein the UE is configured to support a dynamic point selection (DPS) in the high-speed mode.

6. The method of claim 5, wherein the second measurement period represents the relaxation of the first measurement period by a scaling factor for the one or more additional signals transmitted from the second RRH and not for an additional signal transmitted from the first RRH.

7. The method of claim 5, wherein the second measurement period is used for the measurements on the one or more additional signals upon the UE being closer to the first RRH than to the second RRH.

8. An apparatus comprising:
processing circuitry configured to:
receive a first signal from a first transmitter and a second signal from a second transmitter, the first signal and the second signal being of a same signal type that is either a synchronization signal or a reference signal, wherein the first signal includes a synchronization signal block (SSB) or a channel state information reference signal (CSI-RS) in frequency range 1 (FR1);
determine a first measurement period to perform measurements on the first signal and the second signal;
generate, within the first measurement period, a first measurement of the first signal and a second measurement of the second signal, wherein the first measurement includes a layer 1 reference signal received power (L1-RSRP) measurement on the SSB or the CSI-RS; and
determine, as a relaxation of the first measurement based on the L1-RSRP measurement being larger than a predefined threshold measurement and on a SSB or CSI-RS periodicity being smaller than a predefined threshold time period, a second measurement period to perform measurements on one or more additional signals transmitted from the second transmitter, the second measurement period being longer than the first measurement period, the one or more additional signals being of the same signal type.

9. The apparatus of claim 8, wherein the processing circuitry is further configured to:
determine that the L1-RSRP measurement exceeds the predefined threshold measurement.

10. The apparatus of claim 8, wherein the second signal includes a second SSB or a second CSI-RS in FR1, wherein the second measurement includes a second L1-RSRP measurement on the second SSB or the second CSI-RS, and wherein the processing circuitry is further configured to:
determine that a difference between the L1-RSRP measurement and the second L1-RSRP measurement is smaller than the predefined threshold measurement, wherein the second measurement period is determined as the relaxation of the first measurement period further based on the difference being smaller than the predefined threshold measurement.

11. The apparatus of claim 8, wherein the processing circuitry is further configured to:
receive, from a base station, network signaling indicating the predefined threshold measurement.

12. The apparatus of claim 8, wherein the first measurement further includes a layer 1 signal-to-noise and interference ratio (L1-SINR) measurement on the SSB or the CSI-RS, wherein the processing circuitry is further configured to:
determine that the L1-SINR measurement exceeds another predefined threshold measurement, wherein the second measurement period is determined as the relaxation of the first measurement period further based on the L1-SINR measurement exceeding the other predefined threshold measurement.

13. The apparatus of claim 8, wherein the second signal includes a second SSB or a second CSI-RS in FR1, wherein the first measurement further includes a first layer 1 signal-to-noise and interference ratio (L1-SINR) measurement on the SSB or the CSI-RS, wherein the second measurement includes a second L1-SINR measurement on the second SSB or the second CSI-RS, wherein the processing circuitry is further configured to:
determine that a difference between the first L1-SINR measurement and the second L1-SINR measurement is smaller than predefined threshold measurement, wherein the second measurement period is determined as the relaxation of the first measurement period further based on the difference being smaller than the predefined threshold measurement.

14. The apparatus of claim 8, wherein the first measurement further includes a layer 1 signal-to-noise and interference ratio (L1-SINR) measurement on the SSB or the CSI-RS, wherein the second measurement period is determined as the relaxation of the first measurement period based on the L1-SINR measurement being larger than another predefined threshold measurement.

15. The apparatus of claim 8, wherein the first measurement further includes a layer 1 signal-to-noise and interference ratio (L1-SINR) measurement on the SSB or the CSI-RS.

16. The apparatus of claim 8, wherein the second measurement period is used for the measurements on the one or more additional signals upon a user equipment (UE) being configured for non-discontinuous reception (non-DRX) of signals.

17. One or more non-transitory computer-readable storage media storing instructions, that upon execution, cause operations comprising:
receiving a first signal from a first transmitter and a second signal from a second transmitter, the first signal and the second signal being of a same signal type that is either a synchronization signal or a reference signal, wherein the first signal includes a synchronization signal block (SSB) or a channel state information reference signal (CSI-RS) in frequency range 1 (FR1);
determining a first measurement period to perform measurements on the first signal and the second signal;

generating, within the first measurement period, a first measurement of the first signal and a second measurement of the second signal, wherein the first measurement includes a layer 1 signal-to-noise and interference ratio (L1-SINR) measurement on the SSB or the CSI-RS; and determining, as a relaxation of the first measurement based on the L1-SINR measurement being larger than predefined threshold measurement and on a SSB or CSI-RS periodicity being smaller than a predefined threshold time period, a second measurement period to perform measurements on one or more additional signals transmitted from the second transmitter, the second measurement period being longer than the first measurement period, the one or more additional signals being of the same signal type.

18. The one or more non-transitory computer-readable storage media of claim 17, wherein the second measurement period is used for the measurements on the one or more additional signals upon a user equipment (UE) being configured for non-discontinuous reception (non-DRX) of signals.

19. The one or more non-transitory computer-readable storage media of claim 17, wherein the operations further comprise:

receiving, from a base station, network signaling indicating that a dynamic measurement period is to be enabled, wherein the second measurement period represents a dynamic updated of the first measurement period by a scaling factor.

20. The one or more non-transitory computer-readable storage media of claim 19, wherein the operations further comprise:

sending, to the base station prior to receiving the network signaling, UE-user equipment (UE) capability information indicating that the dynamic measurement period is to be supported.

* * * * *

UNITED STATES PATENT AND TRADEMARK OFFICE
CERTIFICATE OF CORRECTION

| | | |
|---|---|---|
| PATENT NO. | : 12,177,703 B2 | Page 1 of 1 |
| APPLICATION NO. | : 17/439713 | |
| DATED | : December 24, 2024 | |
| INVENTOR(S) | : Manasa Raghavan et al. | |

It is certified that error appears in the above-identified patent and that said Letters Patent is hereby corrected as shown below:

On the Title Page

(72) Inventors: please delete "Parades" and insert --Paredes--.

Signed and Sealed this
Fourth Day of February, 2025

Coke Morgan Stewart
*Acting Director of the United States Patent and Trademark Office*